United States Patent
Tyler et al.

(10) Patent No.: US 10,340,483 B2
(45) Date of Patent: Jul. 2, 2019

(54) WELDING PROCESS FOR SEALING A BATTERY MODULE

(71) Applicant: Johnson Controls Technology Company, Holland, MI (US)

(72) Inventors: Matthew R. Tyler, Brown Deer, WI (US); Christopher M. Bonin, South Milwaukee, WI (US); John P. Dinkelman, South Milwaukee, WI (US); Richard M. DeKeuster, Racine, WI (US); Dale B. Trester, Milwaukee, WI (US)

(73) Assignee: CPS Technology Holdings LLC, New York, NY (US)

( * ) Notice: Subject to any disclaimer, the term of this patent is extended or adjusted under 35 U.S.C. 154(b) by 926 days.

(21) Appl. No.: 14/835,626

(22) Filed: Aug. 25, 2015

(65) Prior Publication Data

US 2016/0064702 A1  Mar. 3, 2016

Related U.S. Application Data

(60) Provisional application No. 62/146,781, filed on Apr. 13, 2015, provisional application No. 62/042,005, filed on Aug. 26, 2014.

(51) Int. Cl.
*H01M 2/02* (2006.01)
*H01M 2/08* (2006.01)
(Continued)

(52) U.S. Cl.
CPC ........... *H01M 2/024* (2013.01); *B29C 65/168* (2013.01); *B29C 65/1635* (2013.01);
(Continued)

(58) Field of Classification Search
CPC .................................................... H01M 2/024
See application file for complete search history.

(56) References Cited

U.S. PATENT DOCUMENTS

| 4,117,300 A | 9/1978 | Ricards |
| 4,460,663 A | 7/1984 | Stutzbach et al. |

(Continued)

FOREIGN PATENT DOCUMENTS

| JP | 59150312 | 8/1984 |
| JP | 2005347002 | 12/2005 |

(Continued)

OTHER PUBLICATIONS

Troughton, Michael J. et al., "Handbook of Plastics Joining: A Practical Guide", Handbook of Plastics Joining, Jan. 1, 1997, pp. 134-136.

(Continued)

*Primary Examiner* — Sarah A. Slifka
*Assistant Examiner* — Brian R Ohara
(74) *Attorney, Agent, or Firm* — Fletcher Yoder, P.C.

(57) ABSTRACT

The present disclosure relates to a battery module that includes a housing having a first protruding shelf along a first perimeter of the housing, a second protruding shelf along a second perimeter of the housing, where the first and second protruding shelves each include an absorptive material configured to absorb a first laser emission. The battery module also includes an electronics compartment cover configured to be coupled to the housing via a first laser weld, and a cell receptacle region cover configured to be coupled to the housing via a second laser weld. The electronics compartment cover has a first transparent material configured to transmit the first laser emission toward the first protruding shelf and the cell receptacle region cover has a second transparent material configured to transmit the first (Continued)

laser emission or a second laser emission toward the second protruding shelf.

20 Claims, 10 Drawing Sheets

(51) Int. Cl.
| | | |
|---|---|---|
| *H01M 2/10* | (2006.01) | |
| *H01M 10/42* | (2006.01) | |
| *B29C 65/16* | (2006.01) | |
| *B29C 65/00* | (2006.01) | |
| *B60L 1/00* | (2006.01) | |
| *B60L 1/06* | (2006.01) | |
| *B60L 7/12* | (2006.01) | |
| *B60L 50/16* | (2019.01) | |
| *B60L 50/60* | (2019.01) | |
| *B60L 50/64* | (2019.01) | |
| *B29K 23/00* | (2006.01) | |
| *B29L 31/34* | (2006.01) | |
| *B29K 507/04* | (2006.01) | |
| *B29K 509/08* | (2006.01) | |
| *B29K 105/16* | (2006.01) | |

(52) U.S. Cl.
CPC ........ *B29C 65/1677* (2013.01); *B29C 66/112* (2013.01); *B29C 66/114* (2013.01); *B29C 66/322* (2013.01); *B29C 66/53461* (2013.01); *B29C 66/73921* (2013.01); *B60L 1/003* (2013.01); *B60L 1/06* (2013.01); *B60L 7/12* (2013.01); *B60L 50/16* (2019.02); *B60L 50/64* (2019.02); *B60L 50/66* (2019.02); *H01M 2/08* (2013.01); *H01M 2/1077* (2013.01); *H01M 10/425* (2013.01); *B29C 65/1683* (2013.01); *B29C 66/71* (2013.01); *B29K 2023/12* (2013.01); *B29K 2105/16* (2013.01); *B29K 2507/04* (2013.01); *B29K 2509/08* (2013.01); *B29K 2995/002* (2013.01); *B29K 2995/0026* (2013.01); *B29K 2995/0027* (2013.01); *B29L 2031/3468* (2013.01); *B60L 2240/545* (2013.01); *B60L 2240/547* (2013.01); *B60L 2240/549* (2013.01); *B60L 2250/10* (2013.01); *H01M 2220/20* (2013.01); *Y02T 10/70* (2013.01); *Y02T 10/7005* (2013.01); *Y02T 10/705* (2013.01); *Y02T 10/7077* (2013.01)

(56) References Cited

U.S. PATENT DOCUMENTS

| | | | |
|---|---|---|---|
| 6,174,620 | B1 | 1/2001 | Okada et al. |
| 6,264,708 | B1 | 7/2001 | Haraguchi et al. |
| 7,285,355 | B2 | 10/2007 | Ruth et al. |
| 7,458,996 | B2 | 12/2008 | Ogura et al. |
| 7,646,794 | B2 | 1/2010 | Sakurai et al. |
| 7,879,487 | B2 | 2/2011 | Bechtold |
| 8,399,804 | B2 | 3/2013 | Hosokawa et al. |
| 8,580,428 | B2 | 11/2013 | Kiyama |
| 9,054,393 | B2 | 6/2015 | Kawada et al. |
| 9,059,482 | B2 | 6/2015 | Okamoto et al. |
| 9,099,754 | B2 | 8/2015 | Komatsuki et al. |
| 2003/0039882 | A1 | 2/2003 | Wruck et al. |
| 2004/0137321 | A1 | 7/2004 | Savaria |
| 2005/0145330 | A1 | 7/2005 | Shubinsky et al. |
| 2006/0091849 | A1* | 5/2006 | Huynh ................ H01M 2/0242 320/112 |
| 2006/0105236 | A1 | 5/2006 | Zhu et al. |
| 2006/0278617 | A1 | 12/2006 | Anantharaman et al. |
| 2008/0254242 | A1* | 10/2008 | Asada .................. B29C 66/112 428/34 |
| 2010/0316906 | A1 | 12/2010 | Nansaka et al. |
| 2011/0244285 | A1 | 10/2011 | Shinohara |
| 2012/0052365 | A1 | 3/2012 | Chang |
| 2012/0103714 | A1 | 5/2012 | Choi et al. |
| 2012/0248076 | A1 | 10/2012 | Hosokawa et al. |
| 2014/0186683 | A1 | 7/2014 | Tyler et al. |
| 2014/0308549 | A1 | 10/2014 | Shimizu et al. |
| 2015/0004446 | A1 | 1/2015 | Kim et al. |
| 2015/0104700 | A1 | 4/2015 | Takasu et al. |
| 2015/0129332 | A1 | 5/2015 | Seto et al. |
| 2015/0140372 | A1 | 5/2015 | Kondo |
| 2015/0333364 | A1 | 11/2015 | Tang et al. |
| 2016/0204392 | A1 | 7/2016 | Kim et al. |

FOREIGN PATENT DOCUMENTS

| | | |
|---|---|---|
| JP | 2006286972 | 10/2006 |
| WO | 2015097512 | 7/2015 |

OTHER PUBLICATIONS

PCT/US2015/046989 International Search Report and Written Opinion dated Nov. 5, 2015.

* cited by examiner

WELDING PROCESS FOR SEALING A BATTERY MODULE

CROSS-REFERENCE TO RELATED APPLICATION

This application claims priority from and the benefit of U.S. Provisional Application Ser. No. 62/146,781, filed Apr. 13, 2015, entitled "PLASTIC COVER TO HOUSING INTERFACE GEOMETRY AND MATERIALS FOR LASER WELDING," and U.S. Provisional Application Ser. No. 62/042,005, filed Aug. 26, 2014, entitled "LASER WELD OF A LITHIUM ION BATTERY SYSTEM," which are hereby incorporated by reference in their entirety for all purposes. This application is related to U.S. Non-Provisional application Ser. No. 14/835,615, entitled "COLLAR FOR SEALING A BATTERY MODULE," filed on even date herewith, which is incorporated herein by reference in its entirety for all purposes.

BACKGROUND

The present disclosure relates generally to the field of batteries and battery modules. More specifically, the present disclosure relates to a laser welding process for sealing a battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operate at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may include components disposed in a sealed housing to shield the components from environmental conditions and/or contaminants such as water, dirt, or the like. Additionally, the sealed housing may include a vent path to control emissions of substances produced within the battery module (e.g., battery cell effluent) into a surrounding environment. In some cases, the battery module may be sealed by a cover disposed over a receptacle region and/or a electronics compartment of the housing. However, in some cases, a seal between the housing and the cover may include cracks or gaps, thereby potentially exposing battery module components to the surrounding environment, or vice versa. Therefore, it is now recognized that an improved seal between the housing and the cover is desired.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth below.

The present disclosure relates to a battery module that includes a housing having a first protruding shelf disposed along a first perimeter of the housing, a second protruding shelf disposed along a second perimeter of the housing, where the first protruding shelf and the second protruding shelf each include an absorptive material configured to absorb a first laser emission. The battery module also includes an electronics compartment cover configured to be coupled to the housing via a first laser weld, and a cell receptacle region cover configured to be coupled to the housing via a second laser weld. The electronics compartment cover has a first transparent material configured to transmit the first laser emission through the electronics compartment cover and toward the first protruding shelf and the cell receptacle region cover has a second transparent material configured to transmit the first laser emission or a second laser emission through the cell receptacle region cover and toward the second protruding shelf.

The present disclosure also relates to a battery module that includes a housing having an absorptive material, an electronics compartment, and a cell receptacle region. The electronics compartment includes a first perimeter having a first protruding shelf and the cell receptacle region includes a second perimeter having a second protruding shelf. The electronics compartment is configured to receive a plurality of electronics components and the cell receptacle region is configured to receive a plurality of electrochemical battery cells. The battery module also includes an electronics compartment cover having a first transparent material and a cell receptacle region cover having a second transparent material. The electronics compartment cover is configured to cover the electronics compartment and is capable of forming a first seal with the housing via a first laser weld and the cell receptacle region cover is configured to cover the receptacle region and is capable of forming a second seal with the housing via a second laser weld. One or both of the first laser weld and the second laser weld are formed according to a process that includes disposing the cell receptacle region cover or the electronics compartment cover against the housing, directing a laser toward a third perimeter of the electronics compartment cover or a fourth perimeter of the cell receptacle region cover such that the laser is transmitted through the first transparent material or the second transparent material and is absorbed by the first protruding shelf or the second protruding shelf, respectively, heating the first protruding shelf or the second protruding shelf to a melting point such that a void between the electronics compartment cover or the cell receptacle region cover and the housing is filled with a molten material, and cooling the molten material to form a generally air-tight and water-tight seal between the electronics compartment cover and the housing or the cell receptacle region cover and the housing.

The present disclosure also relates to a method for sealing a battery module that includes disposing a cover having a transparent material against a housing having an absorptive material, directing a laser toward a perimeter of the cover such that the laser is transmitted through the transparent material of the cover and is absorbed by a protruding shelf of the housing, heating the protruding shelf to a melting point of the absorptive material such that a void between the cover and the housing is filled with a molten material, and cooling the molten material to form a generally air-tight and water-tight seal between the cover and the housing.

DRAWINGS

Various aspects of this disclosure may be better understood upon reading the following detailed description and upon reference to the drawings in which.

Figure 13:
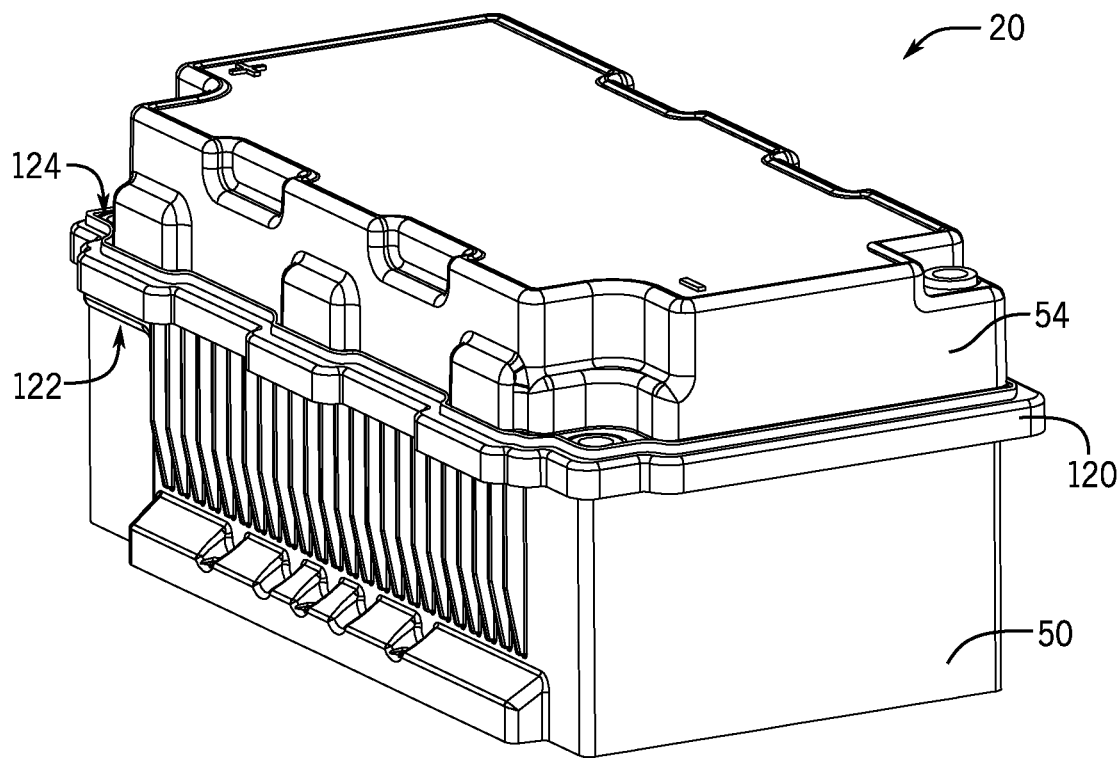
FIG. 13 is a perspective view of the battery module of FIGS. 3-5 sealed using a collar, in accordance with an aspect of the present disclosure.
Figure 14:
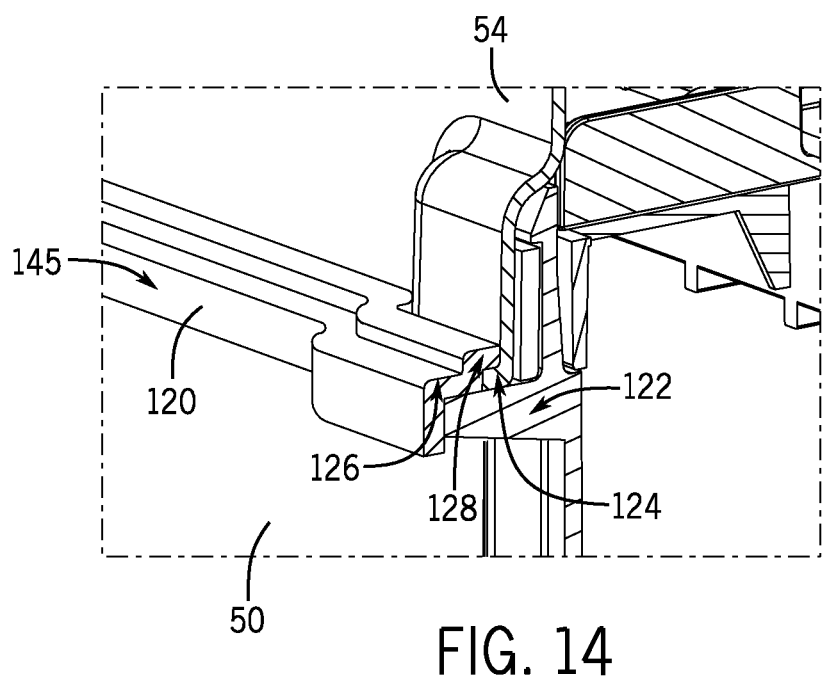
Figure 15:
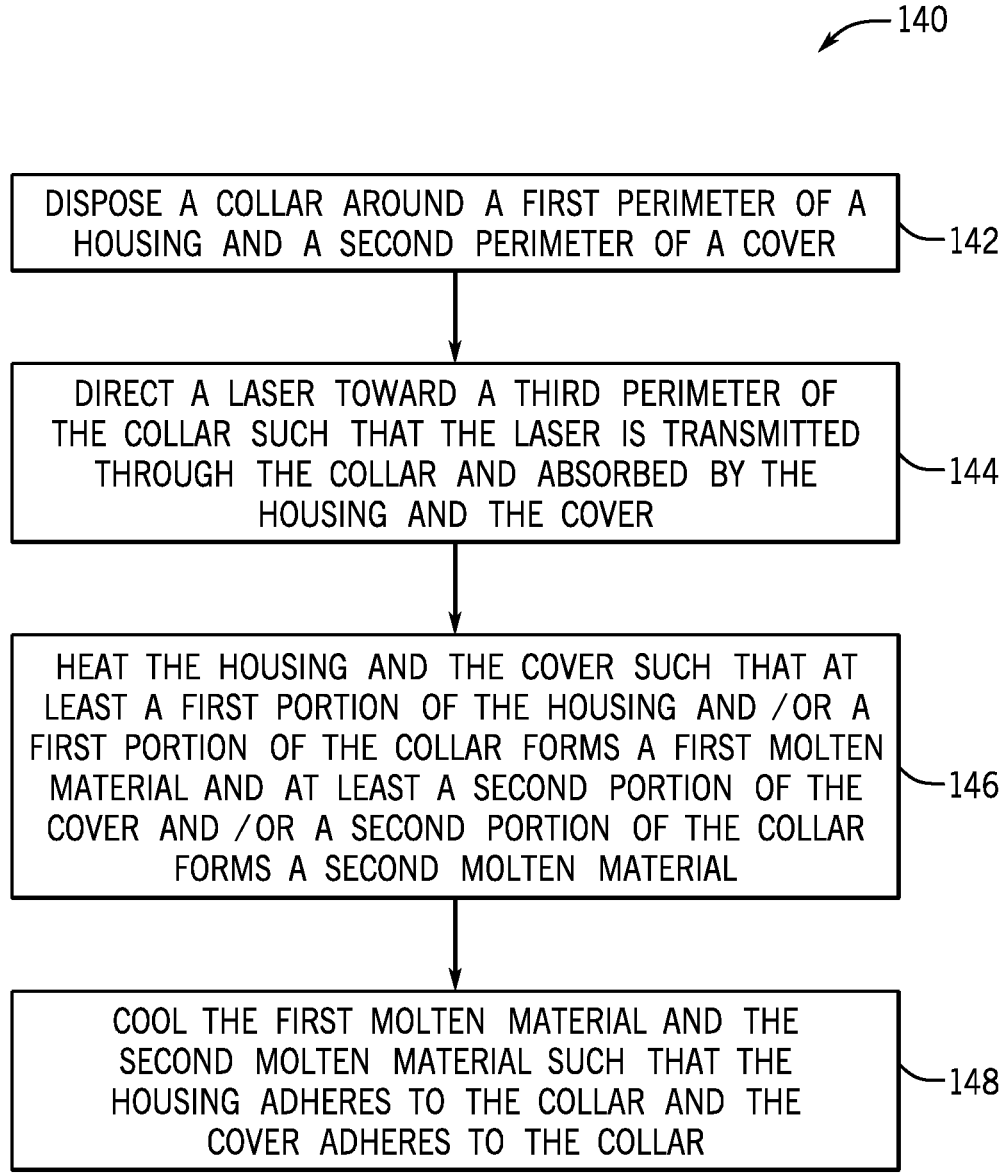

FIG. 14 is a cross-sectional perspective view of a laser weld between the collar of FIG. 13, a housing, and a cell receptacle region cover, in accordance with an aspect of the present disclosure; and FIG. 15 is a flow chart of a process that may be used to seal the cell receptacle region cover to the housing of FIG. 14 using the collar of FIGS. 13 and 14 when the cell receptacle region cover includes an absorptive material, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs)

and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

Battery modules may include a housing and a cover that enclose individual components (e.g., individually sealed battery cells) of the battery module and protect such components from conditions and/or contaminants from a surrounding environment. Additionally, the housing and the cover may be sealed to one another to prevent inadvertent emissions of substances produced in the battery module (e.g., chemicals and/or exhaust gas) into the surrounding environment. In some cases, the seal between the cover and the housing may have gaps and/or openings that expose sensitive components to contaminants and/or enable battery module emissions to be unintentionally released. However, it may be desirable for the battery module to include a generally air-tight and/or water-tight seal, such that components disposed in the housing may be protected when the battery module is exposed to environments having high concentrations of liquids and/or contaminants. Therefore, an improved sealing technique may be desirable to provide an air-tight and/or water-tight seal between the housing and the cover. It is now recognized that a laser weld between one or more covers and a housing of the battery module (including shelf features to facilitate engagement and sealing) may form an air-tight and/or water-tight seal that eliminates and/or substantially reduces gaps or openings between the housing and the one or more covers.

In accordance with certain embodiments of the present disclosure, the housing and the cover of the battery module may include materials that are not traditionally used in laser welding processes. For example, the battery module housing and the cover may include plastic. Moreover, in some cases, the housing and the cover of the battery module may include different materials (e.g., metal), further complicating the formation of a seal between the two components. In certain embodiments, the material of the cover and the material of the housing may be selected based on a number of considerations relating to their properties, such as their strength, weight, and conductivity. In certain embodiments, an assembler may choose to utilize a cover with a transmissive material (e.g., a material more transmissive than the housing) that has a desired level of transparency, thereby enabling a laser to pass through the cover (e.g., a substantial amount of energy is not absorbed by the cover). Conversely, the housing may include an absorptive material (e.g., a material more absorptive than the cover) that absorbs energy (e.g., light) from the laser welding process. The absorbed energy may cause a temperature of the absorptive material to increase, and thus, at least a portion of the absorptive material (e.g., a protruding shelf) may melt when the absorptive material reaches a certain temperature (e.g., a melting point of the absorptive material). When a portion of the absorptive material melts, it may fill a gap or void between the housing and the cover, thus creating an air-tight and/or water-tight seal when molten absorptive material cools and re-hardens (e.g., re-solidifies).

However, in some cases, it may not be feasible to select the materials of the housing and the cover based on their transmissive properties. For example, the material for the cover and the housing may be predetermined by a supplier, and thus, the assembler (e.g., manufacturer of the battery module) may not have the ability to select a desired transmissivity of the materials. For example, a cover purchased from a supplier may include a material that is absorptive, and thus, directly laser welding such a cover to the housing may not be desirable (e.g., the cover may absorb substantially all of the energy from the laser, thereby blocking formation of the laser weld between the cover and the housing). In certain embodiments of the present disclosure, a collar may be utilized to couple the cover to the housing and create a substantially air-tight and/or water-tight seal. For example, the collar may include a transmissive material (e.g., a material more transmissive than the housing) that enables the laser to pass through the collar. Accordingly, energy from the laser may pass through the collar to both the cover and to the housing. In certain embodiments, at least a first portion of the housing and at least a second portion of the cover may increase in temperature upon exposure to the energy (e.g., light) from the laser, and thus, cause at least a portion of the collar to melt. Molten collar material may adhere to both the cover and the housing when cooled (e.g., re-solidified) to form the seal. In other embodiments, the first portion of the housing and the second portion of the cover may melt and adhere to the collar when cooled (e.g., re-solidified) to form the seal. In any case, a substantially air-tight and/or water-tight seal may be formed between a cover having an absorptive material and the housing via the collar.

Laser welding the cover to the housing may create a generally air-tight and/or water-tight seal such that the battery module components may be blocked from exposure to contaminants even when the battery module is located in an environment having a high concentration of such contaminants (e.g., water, dirt). Accordingly, it is now recognized that laser welding the cover to the housing may produce a stronger and more robust seal between the cover and the housing, which may enhance an operating life of the battery module. Additionally, the stronger and more robust seal may enhance a resistance of the battery module to damage caused by shock vibrations, drops, and/or crash testing.

Figure 1:
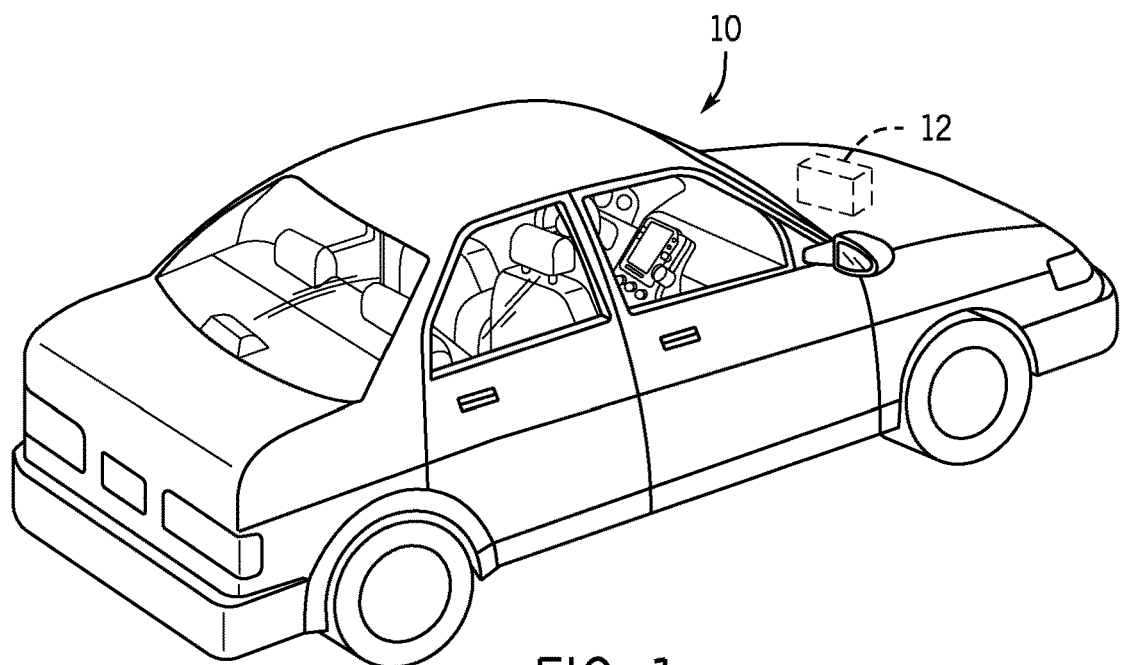
FIG. 1 is a perspective view of a vehicle having a battery system configured in accordance with present embodiments to provide power for various components of the vehicle, in accordance with an aspect of the present disclosure.

To help illustrate the manner in which the present embodiments may be used in a system, FIG. 1 is a perspective view of an embodiment of a vehicle 10 (e.g., an xEV), which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10).

Figure 2:
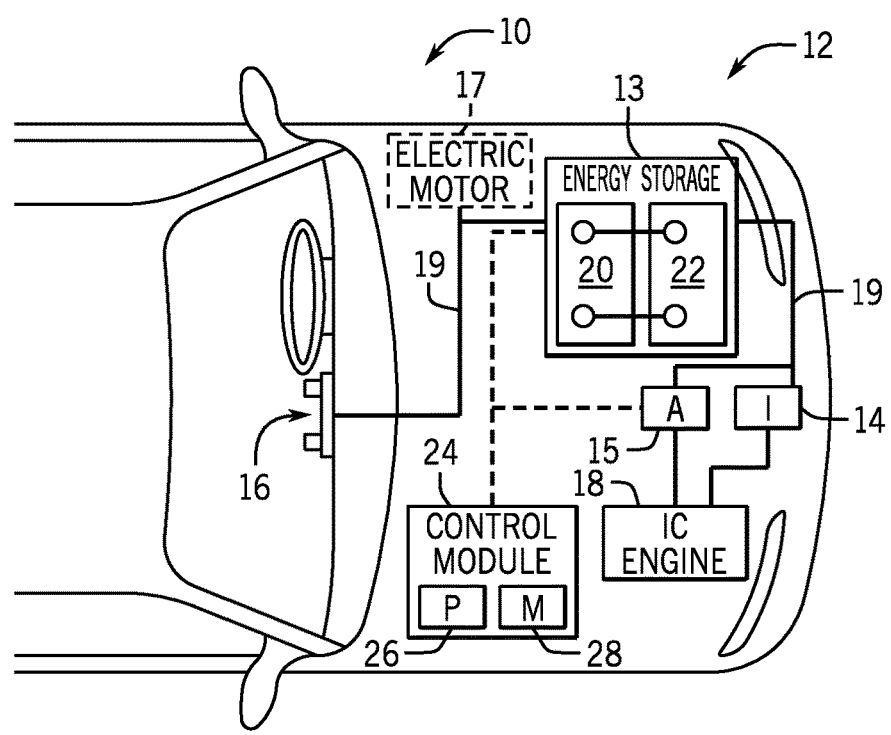
FIG. 2 is a cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) an internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells (e.g., individually sealed battery cells). In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within the energy storage component 13, the alternator 15, and/or the electric motor 17. For example, the control module 24 may regulate an amount of electrical energy captured/supplied by each battery module 20 or 22 (e.g., to de-rate and re-rate the battery system 12), perform load balancing between the battery modules 20 and 22, determine a state of charge of each battery module 20 or 22, determine a temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

As discussed above, some components included in the battery module 20 may be sensitive to conditions and/or contaminants (e.g., water, dirt, other debris) that may be present in a surrounding environment of the battery module 20. Accordingly, it may be desirable to form an air-tight and/or water-tight seal between one or more covers and a housing of the battery module 20 to prevent damage to the sensitive components. Additionally, the air-tight and/or water-tight seal may enable substances produced in the battery module (e.g., exhaust gas) to be directed along a predetermined vent path, which may controllably emit such substances into a line specifically configured to release them into the surrounding environment. Laser welding the one or more covers to the housing of the battery module 20 in accordance with presently disclosed techniques may form a more secure seal when compared to traditional coupling methods. Additionally, the seal formed using the presently disclosed laser welding process may be substantially air-tight and/or water-tight. In certain embodiments, when the one or more covers include a transmissive material (e.g., a material more transmissive than the housing), the one or more covers may be directly laser welded to the housing. Conversely, a collar may be utilized to form the seal between the one or more covers and the housing when the one or more covers include an absorptive material.

Figure 3:
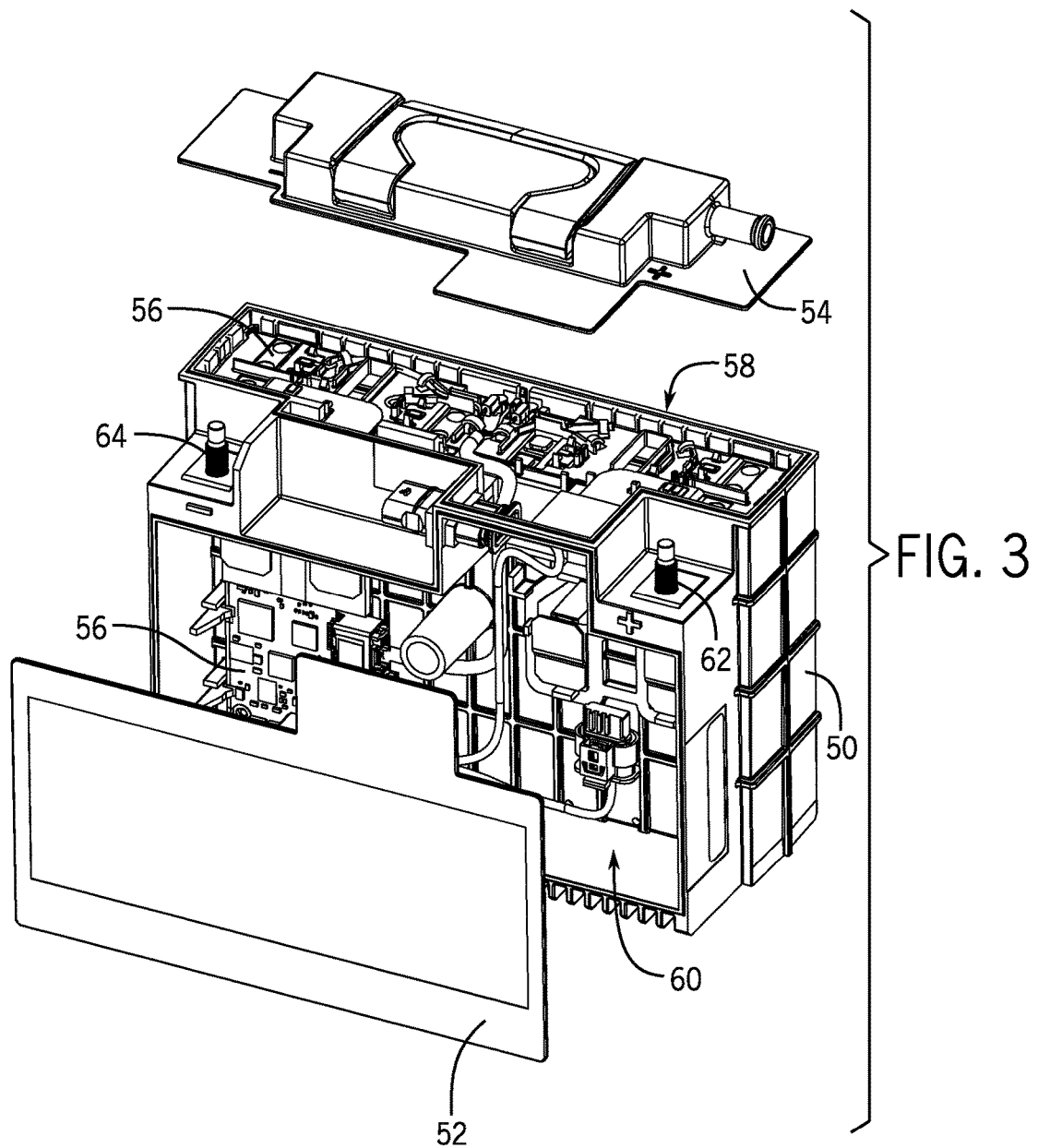
FIG. 3 is an exploded perspective view of a battery module that may be sealed using an improved laser welding technique, in accordance with an aspect of the present disclosure.

For example, FIG. 3 is an exploded perspective view of the battery module 20 that may be sealed using embodiments of the disclosed laser welding technique. As shown in the illustrated embodiment, FIG. 3 includes a housing 50, an electronics compartment cover 52, and a cell receptacle region cover 54. Battery module components 56 (e.g., electrochemical cells, electronics) may be disposed in a cell receptacle region 58 of the housing 50 and/or in an electronics compartment 60 of the housing 50. Such battery module components 56 may enable the battery module 20 to produce and supply electrical current to a load (e.g., the xEV 10). For example, the battery module 20 may include one or more individually sealed electrochemical cells, each having at least one cell terminal. As used herein, an individually sealed electrochemical cell may have a separate housing from the battery module 20 that encloses and seals all components (e.g., chemicals) of the electrochemical cell. In certain embodiments, the at least one cell terminal of each electrochemical cell may be coupled to a bus bar. A plurality of such bus bars may interconnect the electrochemical cells to one another as well as to terminals of the battery module 20. For example, the battery module 20 may include a first module terminal 62 (e.g., positive terminal) and a second module terminal 64 (e.g., negative terminal). The first and second module terminals 62, 64 may be electrically coupled to a load and ultimately supply electrical power to the load (e.g., the xEV).

The electrochemical cells and other battery module components 56 (e.g., electronics) may be sensitive to conditions and/or contaminants present in a surrounding environment of the battery module 20. Accordingly, the electronics compartment cover 52 and the cell receptacle region cover 54 may be physically (e.g., permanently) coupled to the housing 50. For example, the electronics compartment cover 52 may be coupled to the housing 50 such that the electronics compartment cover 52 substantially covers the electronics compartment 60 (e.g., forms an air-tight and/or water-tight seal) and the cell receptacle region cover 54 may be coupled to the housing 50 such that the cell receptacle region cover 54 substantially covers the cell receptacle region 58 (e.g., forms an air-tight and/or water-tight seal). In certain embodiments, the electronics compartment cover 52 and/or the cell receptacle region cover 54 may form a substantially air-tight and/or water-tight seal with the housing 50. Therefore, the battery module components 56 may be protected and/or blocked from exposure to any contaminants (e.g., water or moisture) in the surrounding environment of the battery module 20. To form the substantially air-tight and/or water-tight seal, a laser weld may be formed between the electronics compartment cover 52 and the housing 50 and/or between the cell receptacle region cover 54 and the housing 50. A process for forming the substantially air-tight and/or water-tight seal may depend at least on a material composition of the housing 50, the electronics compartment cover 52, and the cell receptacle region cover 54.

In certain embodiments, the electronics compartment cover 52 and the cell receptacle region cover 54 may each include a transmissive material (e.g., a transparent material that is more transmissive than a material of the housing 50). For example, the electronics compartment cover 52 may include a first transmissive material (e.g., a first transparent material) that may allow the laser to pass through the electronics compartment cover 52 without absorbing a substantial amount of the energy. In other words, the first transmissive material (e.g., the first transparent material) may enable the laser to pass from a first surface of the electronics compartment cover 52 to a second surface of the electronics compartment cover 52 without incurring a substantial increase in temperature. In other embodiments, a first portion of the electronics compartment cover 52 may include the first transmissive material, and a second portion of the electronics compartment cover 52 may include an absorptive material or another material different from the first transmissive material. The first transmissive material may include a polymeric material (e.g., polypropylene). For example, the polymeric material may be transmissive black polypropylene. As used herein, transmissive black polypropylene may be a polymeric material that includes a black colorant additive and has transmissive properties (e.g., allowing the laser to pass through the electronics compartment cover 52 without absorbing a substantial amount of the energy).

Further, the first transmissive material may include one or more fillers. For example, the first transmissive material may include polypropylene (e.g., black transmissive polypropylene) having a glass filler. As used herein a glass filler may be glass particles that are homogenously mixed with a base material (e.g., black transmissive polypropylene). The glass filler may add structural reinforcement to the base material (e.g., black transmissive polypropylene), thereby enhancing a strength of the base material. In certain embodiments, the glass filler may also reduce a transmissivity of a given material, thereby increasing an amount of energy that the material absorbs. The amount of glass filler included in the base material (e.g., black transmissive polypropylene) may depend on a desired transmissivity of the first transmissive material and/or a wavelength of a laser that may be used for the laser welding process. For example, a percent weight of glass filler included in the first transmissive material may be between 0% and 50%, between 10% and 40%, between 25% and 35%, or any combination thereof. In other embodiments, any suitable filler or pigment may be utilized to enhance a structural integrity of the base material and/or to increase or decrease the transmissivity of the first transmissive material to the desired transmissivity.

In certain embodiments, the percent weight of the filler may be inversely proportional to the wavelength of the laser and/or proportional to the power (e.g., intensity) of the laser. For example, as the wavelength of the laser increases, the power of the laser (e.g., energy output) decreases, and thus, it may be desirable to include a lower percent weight of filler to increase transmissivity and enable more energy to pass through the electronics compartment cover 52. Conversely, as the wavelength of the laser decreases, the power of the laser (e.g., the energy output) may increase. Therefore, it may be desirable to increase the percent weight of filler in the first transmissive material so that some energy is absorbed by the first transmissive material and an amount of energy passing through the electronics compartment cover 52 may be substantially constant regardless of the operating wavelength and power of the laser.

In other embodiments, the first transmissive material may include polyphenylene sulfide (PPS), nylon, or any combination thereof. Additionally, the PPS and/or the nylon may or may not include fillers (e.g., glass filler). In still further embodiments, the electronics compartment cover 52 may include an absorptive material that may absorb all, or substantially all, energy directed at the electronics compartment cover 52. For example, when the laser is directed toward the electronics compartment cover 52, the electronics compartment cover 52 may absorb the energy emitted from the laser, and thus not direct a substantial amount of energy toward the housing 50. Welding the electronics compartment cover 52 to the housing 50 when the electronics compartment cover 52 includes an absorptive material is discussed in more detail herein with reference to FIGS. 12-15.

Additionally, the cell receptacle region cover 54 may include a second transmissive material (e.g., a second transparent material that is more transmissive than the material of the housing 50). In certain embodiments, the second transmissive material may be the same as the first transmissive material. In other embodiments, the first and second transmissive materials may be different. For example, the second transmissive material (e.g., second transparent material) may allow the laser to pass through the cell receptacle region cover 54 without absorbing a substantial amount of the energy. In other words, the second transmissive material (e.g., second transparent material) may enable energy to pass from a first surface of the cell receptacle region cover 54 to a second surface of the cell receptacle region cover 54 without incurring a substantial increase in temperature. In other embodiments, a first portion of the cell receptacle region cover 54 may include the second transmissive material, and a second portion of the cell receptacle region cover 54 may include an absorptive material or another material different from the second transmissive material. The second transmissive material may include a polymeric material. For example, the polymeric material may be transmissive black polypropylene.

Further, the second transmissive material may include one or more fillers. For example, the second transmissive material may include polypropylene (e.g., black transmissive polypropylene) having the glass filler. As discussed above, the glass filler may add structural reinforcement to the base material (e.g., black transmissive polypropylene), thereby enhancing a strength of the base material. Additionally, the glass filler may reduce a transmissivity of the second transmissive material, thereby increasing an amount of energy that the cell receptacle region cover 54 may absorb. The amount of glass filler included in the base material (e.g., black transmissive polypropylene) of the cell receptacle region cover 54 may depend on a desired transmissivity of the second transmissive material, the wavelength of the laser, and/or the power (e.g., intensity) of the laser. For example, a percent weight of glass filler included in the second transmissive material may be between 0% and 50%, between 10% and 40%, between 25% and 35%, or any combination thereof. In other embodiments, any suitable filler or pigment may be utilized to enhance a structural integrity of the base material and/or increase or decrease the transmissivity of the second transmissive material to the desired transmissivity.

In other embodiments, the second transmissive material may include polyphenylene sulfide (PPS), nylon, or any combination thereof. Additionally, the PPS and/or the nylon may or may not include fillers (e.g., glass filler). In still further embodiments, the cell receptacle region cover 54 may include an absorptive material that may absorb all, or substantially all, energy directed at the cell receptacle region cover 54. For example, when the laser is directed toward the cell receptacle region cover 54, the cell receptacle region cover 54 may absorb the energy emitted from the laser, and thus not direct a substantial amount of energy toward the housing 50. Welding the cell receptacle region cover 54 to the housing 50 when the cell receptacle region cover 54 includes an absorptive material is discussed in more detail herein with reference to FIGS. 12-15.

In certain embodiments, the housing 50 may include an absorptive material (e.g., a material more absorptive than a material of the electronics compartment cover 52 and/or a material of the cell receptacle region cover 54). Accordingly, when the laser is directed toward the housing 50, the housing 50 may be configured to absorb the energy emitted from the laser. In certain embodiments, the absorption of energy may cause a temperature of the housing 50 to increase, which may eventually cause at least a portion (e.g., a protruding shelf) of the housing 50 to melt.

In certain embodiments, the absorptive material may be a polymeric material (e.g., polypropylene). Additionally, the absorptive material may include one or more fillers that may enhance absorptive properties of the absorptive material. For example, the absorptive material may be polypropylene that includes a carbon black filler. As used herein, a carbon black filler may be a black pigment that increases absorptive qualities of a base material (e.g., polypropylene). In certain embodiments, a weight percent of carbon black in the base material (e.g., polypropylene) may be between 0% and 10%, between 0.01% and 1%, between 0.1% and 0.5%, or any combination thereof. The amount of filler included in the absorptive material may depend on the wavelength of the laser, a power (e.g., energy output) of the laser, and/or the transmissivity of the electronics compartment cover 52 and/or the cell receptacle region cover 54. When too much carbon black filler is utilized, the desirable qualities of the absorptive material (e.g., polymeric material) may diminish, and when too little carbon black filler is included, the absorptive material may not absorb a sufficient amount of energy. Therefore, it should be understood that there is a delicate balance regarding an amount of carbon black filler included in the base material (e.g., polypropylene). Additionally, in certain embodiments, the carbon black filler may be included in the base material only at a predetermined weld spot (e.g., where the laser will be directed). In other embodiments, the carbon black filler may be mixed homogenously throughout the base material. In still further embodiments, the absorptive material of the housing 50 may include PPS, nylon, or any combination thereof.

As discussed above, the laser welding process may depend on the materials included in the housing 50, the electronics compartment cover 52, and/or the cell receptacle region cover 54. For example, when the electronics compartment cover 52 and/or the cell receptacle region cover 54 include a material that has a relatively high transmissivity (e.g., a material more transmissive than the housing 50), it may be desirable to directly laser weld the electronics compartment cover 52 and/or the cell receptacle region cover 54 to the housing 50. However, when the electronics compartment cover 52 and/or the cell receptacle region cover 54 include an absorptive material and/or a material having a relatively low transmissivity, a collar may be utilized to form the seal between the electronics compartment cover 52 and the housing 50 and/or between the cell receptacle region cover 54 and the housing 50. In any case, the electronics compartment cover 52 and the cell receptacle region cover 54 may be sealed to the housing 50 such that the battery module 20 is substantially air-tight and/or water-tight.

Figure 4:
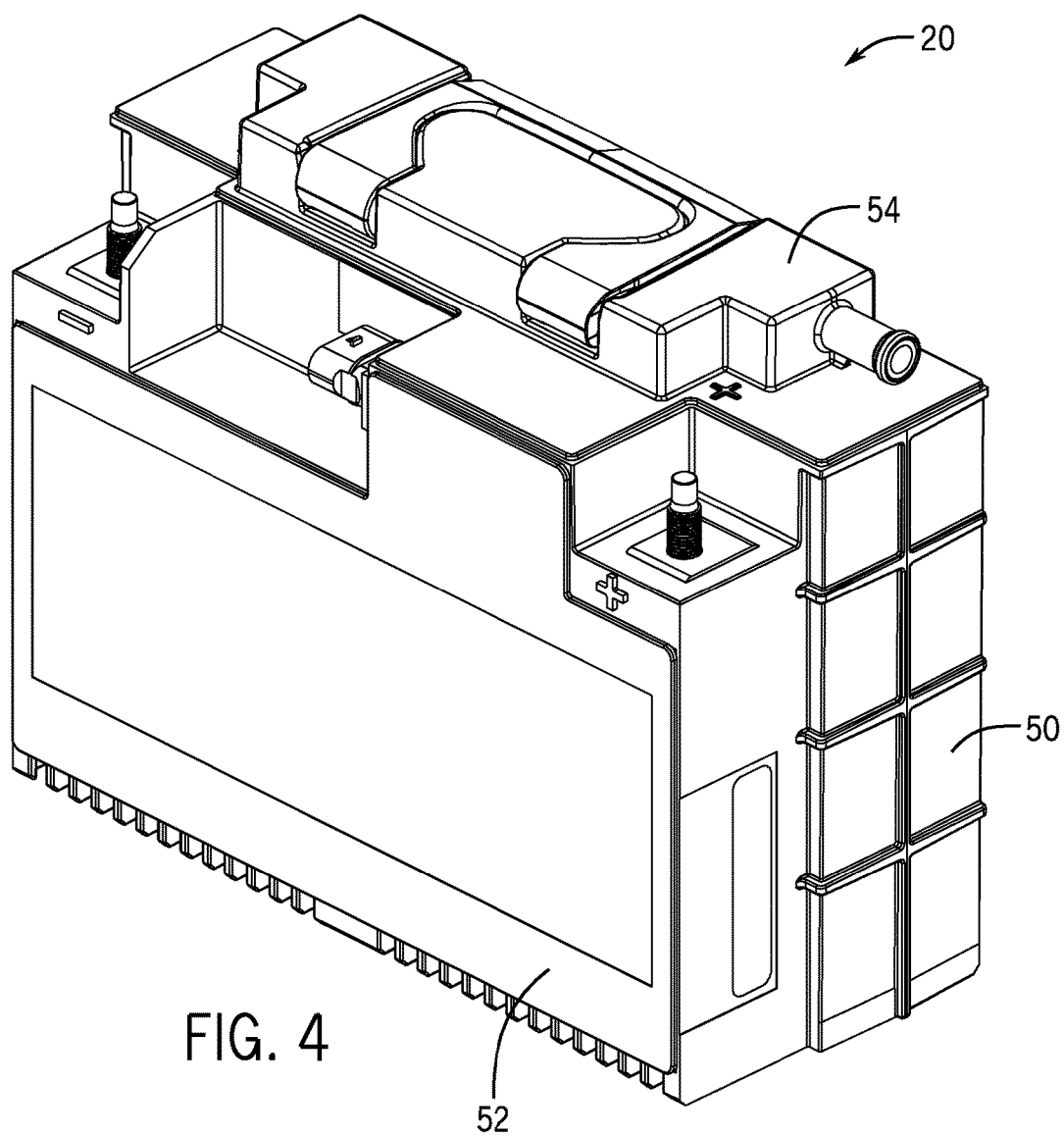
FIG. 4 is a perspective view of the battery module of FIG. 3 with an electronics compartment cover and a cell receptacle region cover laser welded to a housing, in accordance with an aspect of the present disclosure.

For example, FIG. 4 illustrates a perspective view of the battery module 20 with the electronics compartment cover 52 and the cell receptacle region cover 54 laser welded to the housing 50. As shown in the illustrated embodiment of FIG. 4, no gaps or spaces are formed between the electronics compartment cover 52 and the housing 50 and/or the cell receptacle region cover 54 and the housing 50. In other words, the cell receptacle region 58 and the electronics compartment 60 are completely covered by the cell receptacle region cover 54 and the electronics compartment cover 52, respectively. Therefore, the battery module 20 may be substantially air tight and/or water-tight, which may enhance a lifetime of the battery module 20.

Figure 5:
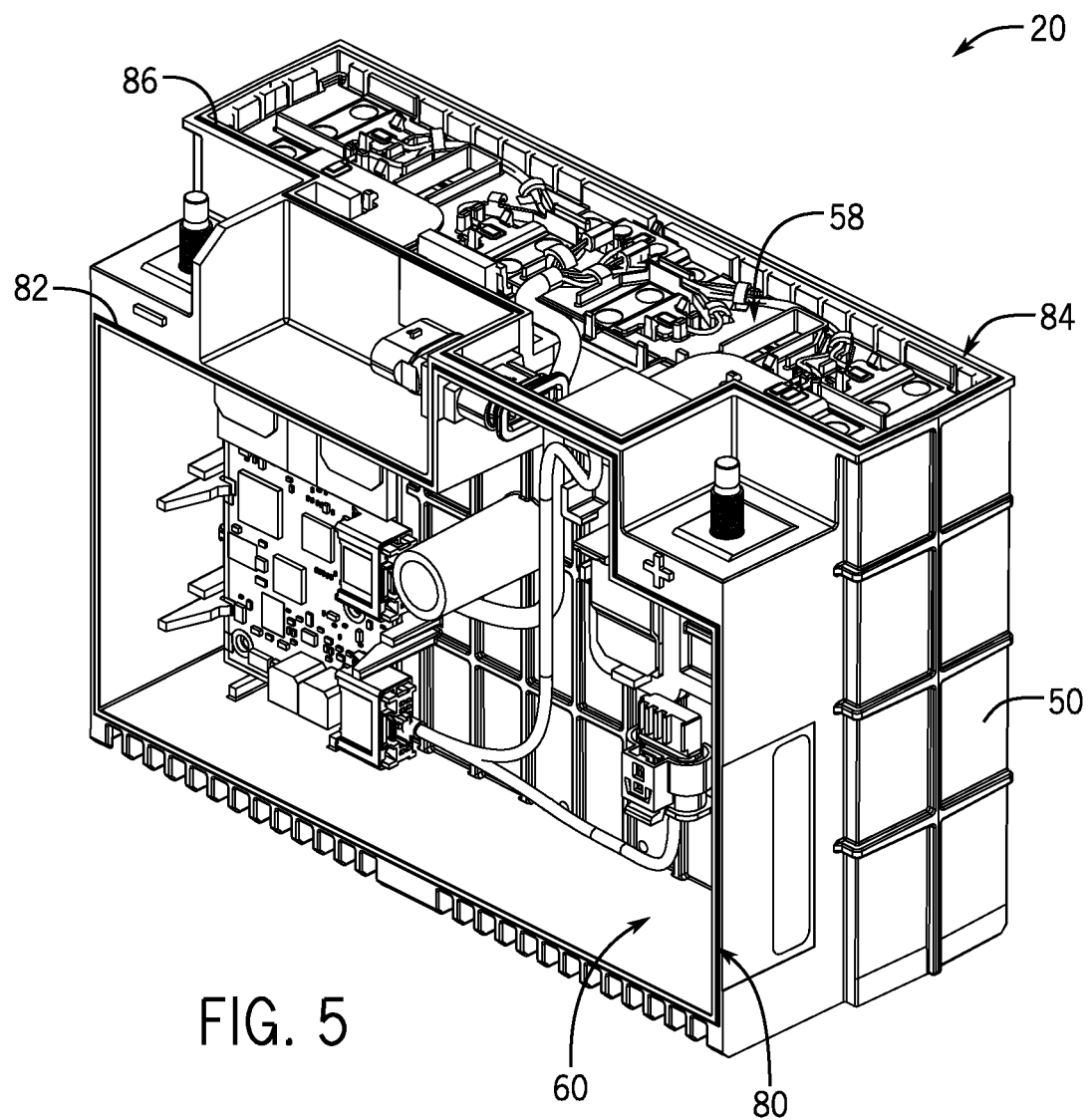
FIG. 5 is a perspective view of the battery module of FIGS. 3 and 4 without the electronics compartment cover and the cell receptacle region cover to show physical features that may facilitate a laser weld, in accordance with an aspect of the present disclosure.

In certain embodiments, the housing 50 of the battery module 20 may include physical features that may facilitate a laser weld between the electronics compartment cover 52 and the housing 50 and/or the cell receptacle region cover 54 and the housing 50. For example, FIG. 5 is a perspective view of the battery module 20 of FIG. 4 without the electronics compartment cover 52 and the cell receptacle region cover 54 to make such physical features visible. As shown in the illustrated embodiment of FIG. 5, a first perimeter 80 of the electronics compartment 60 includes a first protruding shelf 82. Additionally, a second perimeter 84 of the cell receptacle region 58 includes a second protruding shelf 86. In certain embodiments, the first and second protruding shelves 82, 86 may be utilized to facilitate welding the electronics compartment cover 52 and/or the cell receptacle region cover 54 to the housing 50. For example, a weld spot of a laser may be directed toward the first protruding shelf 82 and/or the second protruding shelf 86 during the laser welding process. Accordingly, the first protruding shelf 82 and/or the second protruding shelf 86 may melt to form a molten material that may fill a gap or void between the housing 50 and the electronics compartment cover 52 and/or the housing 50 and the cell receptacle region cover 54. Additionally, the first protruding shelf 82 and/or the second protruding shelf 86 may include a relatively large surface area to place the electronics compartment cover 52 and/or the cell receptacle region cover 54 against.

In certain embodiments, the first protruding shelf 82 and/or the second protruding shelf 86 may include the same material as the housing 50 (e.g., the absorptive material). In other embodiments, the first protruding shelf 82 and the second protruding shelf 86 may include the absorptive material, and any remaining portions of the housing 50 may include a different material (e.g., the first and/or second transmissive material or a second absorptive material). Further, the first protruding shelf 82 and/or the second protruding shelf 86 may be integrated into the housing 50 (e.g., molded into the housing 50). For example, the first protruding shelf 82 and/or the second protruding shelf 86 may be formed by etching or cutting out a portion of the first perimeter 80 and/or the second perimeter 84. In other embodiments, the first protruding shelf 82 and/or the second protruding shelf 86 may be separate components from the housing 50 that are coupled to the housing 50 (e.g., via an adhesive) during assembly.

Figure 6:
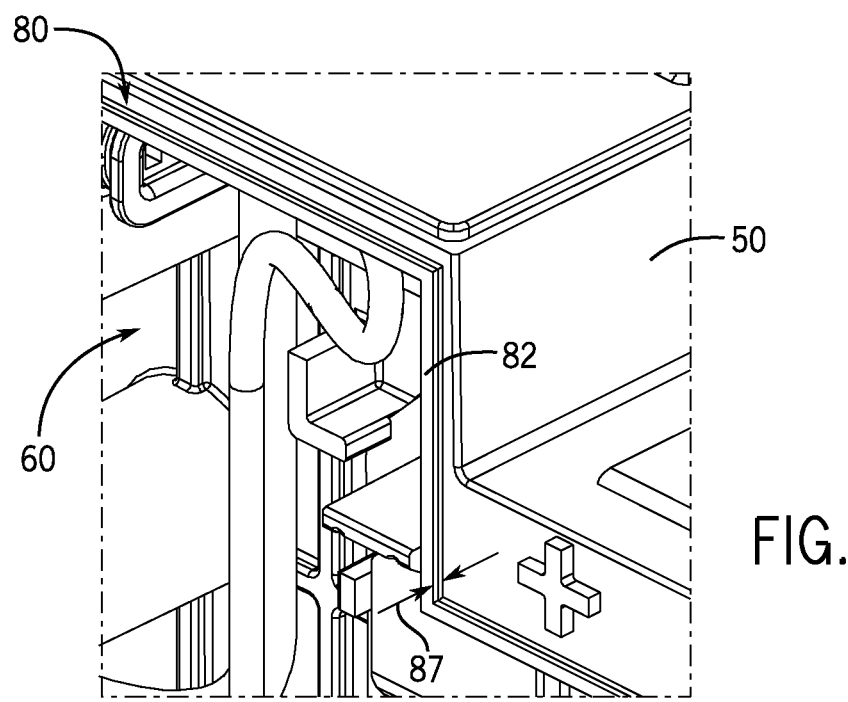
FIG. 6 is an expanded perspective view of a first protruding shelf disposed on a perimeter of a electronics compartment of the housing of FIGS. 3-5, in accordance with an aspect of the present disclosure.

FIG. 6 is an expanded perspective view of the first protruding shelf 82 disposed on the first perimeter 80 of the electronics compartment 60. In certain embodiments, the first protruding shelf 82 may extend along the entire first perimeter 80 of the electronics compartment 60. In other embodiments, the first protruding shelf 82 may extend along only a portion of the first perimeter 80. As shown in the illustrated embodiment of FIG. 6, the first protruding shelf 82 may extend a first distance 87 from the first perimeter 80 of the electronics compartment 60. In certain embodiments, the first distance 87 may be predetermined based on a size of the gap or void that forms between the housing 50 and the electronics compartment cover 52 before the laser weld is formed (see FIG. 8). For example, as a size of the gap or void between the housing 50 and the electronics compartment cover 52 increases, the first distance 87 may also increase, such that more molten material may be formed to fill in the gap or void. Similarly, as the size of the gap or void between the housing 50 and the electronics compartment cover 52 decreases, the first distance 87 may also decrease because less molten material may be utilized to fill the gap or void. Additionally, in certain embodiments, the first distance 87 may be substantially constant along the first perimeter 80 of the electronics compartment 60. In other embodiments, the first distance 87 may vary along the first perimeter 80 in proportion to a size of the gap or void between the housing 50 and the electronics compartment cover 52. In still further embodiments, the first distance 87 may vary along the first perimeter 80 in proportion to a groove of the first protruding shelf 82 (see FIG. 7).

As shown in the illustrated embodiment of FIG. 6, the first protruding shelf 82 includes relatively sharp edges and/or corners that correspond to edges and corners around the first perimeter 80 of the electronics compartment 60. However, it should be noted that the first protruding shelf 82 may include edges and/or corners with any suitable shape (e.g., rounded edges and/or corners).

Figure 7:
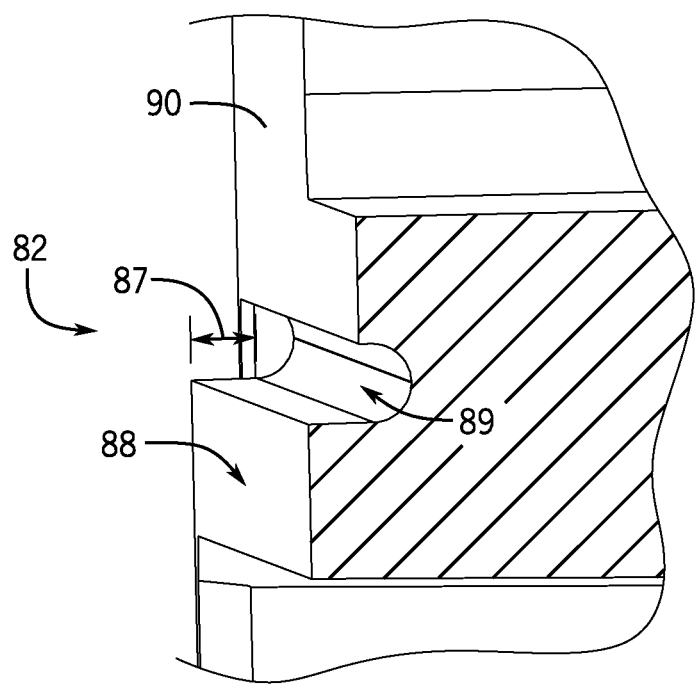
FIG. 7 is a cross-sectional perspective view of the first protruding shelf of FIG. 6, in accordance with an aspect of the present disclosure.

Additionally, the first protruding shelf 82 may include a protrusion 88 (e.g., a first protrusion), a groove 89 (e.g., a first groove), and a lip 90 (e.g., a first lip), as shown in FIG. 7. For example, the first protruding shelf 82 may include the protrusion 88 that extends the first distance 87 from the lip 90. In certain embodiments, the laser may be directed toward the protrusion 88, thereby causing the protrusion 88 to melt. As the protrusion 88 melts, molten material may collect in the groove 89, which may prevent molten material from spilling over the lip 90. In certain embodiments, the groove 89 may include a semi-circular shaped cross-section that enables molten material to collect in the groove 89 and to contact the electronics compartment cover 52. In other embodiments, the groove 89 may include any suitable shape to enable the molten material to collect in the groove 89 and to contact the electronics compartment cover 52. Therefore, when the molten material cools and re-hardens (e.g., re-solidifies), the electronics compartment cover 52 may adhere to the housing 50. In certain embodiments, the molten material may fill any gaps and/or voids between the electronics compartment cover 52 and the housing 50, thereby forming a substantially air-tight and/or water-tight seal.

Figure 8:
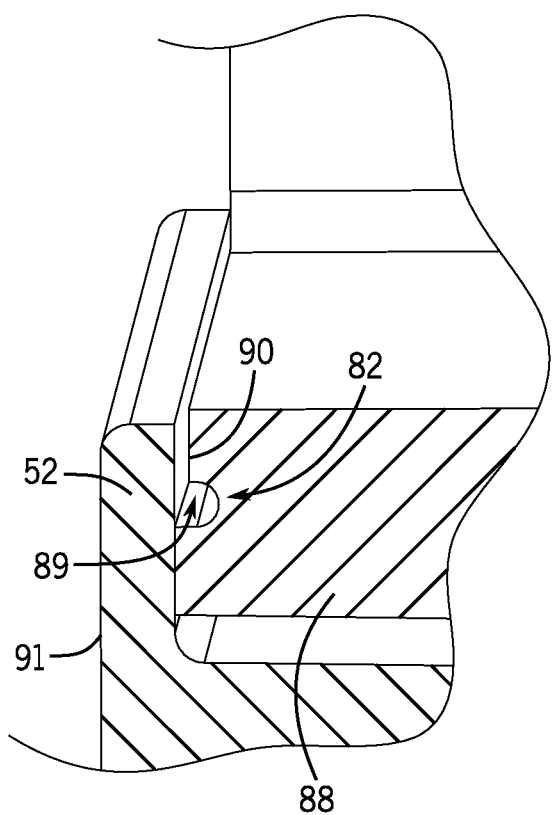
FIG. 8 is a cross-sectional perspective view of the electronics compartment cover of FIG. 4 disposed adjacent to the first protruding shelf of FIGS. 6 and 7, in accordance with an aspect of the present disclosure.

In certain embodiments, the protrusion 88 of the first protruding shelf 82 may be configured to provide a surface for the electronics compartment cover 52 to contact prior to formation of the laser weld. For example, FIG. 8 is a cross-sectional perspective view of the electronics compartment cover 52 adjacent to the protrusion 88 of the first protruding shelf 82. As shown in the illustrated embodiment of FIG. 8, the protrusion 88 of the first protruding shelf 82 is disposed against the electronics compartment cover 52; however, the electronics compartment cover 52 does not interlock with the first protruding shelf 82 and/or another feature of the housing 50 (e.g., via an interference fit). A laser weld may be performed to couple the electronics compartment cover 52 to the housing 50. Accordingly, in certain embodiments, a laser may be directed at a third perimeter 91 of the electronics compartment cover 52, such that a weld spot of the laser is aligned with the first protruding shelf 82. When the electronics compartment cover 52 includes the first transmissive material, the laser may be directed through the third perimeter 91 of the electronics compartment cover 52 and toward the protrusion 88 of the first protruding shelf 82. Accordingly, when the material of the protrusion 88 reaches a melting point, molten material may collect in the groove 89 as well as fill a gap between the electronics compartment cover 52 and the housing 50. The laser may then be removed (or turned off) such that the molten material may cool and re-harden (e.g., re-solidify). Upon re-hardening, the housing 50 may adhere to the electronics compartment cover 52, thereby eliminating and/or substantially reducing any gaps and/or openings that may form between the housing 50 and the electronics compartment cover 52.

Figure 9:
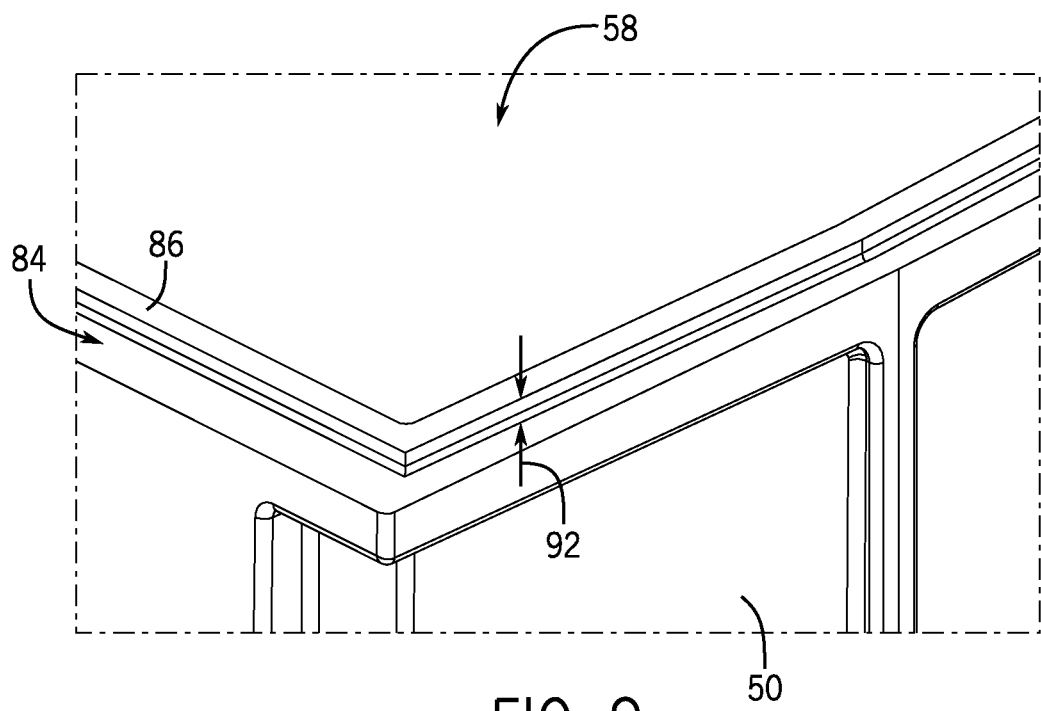
FIG. 9 is a close-up perspective view of a second protruding shelf disposed on a second perimeter of a receptacle region of the housing of FIGS. 3-5, in accordance with an aspect of the present disclosure.

As discussed above, the second perimeter 84 of the cell receptacle region 58 may also include the second protruding shelf 86. For example, FIG. 9 is an expanded perspective view of the second protruding shelf 86 disposed on the second perimeter 84 of the cell receptacle region 58 of the housing 50. In certain embodiments, the second protruding shelf 86 may extend along the entire second perimeter 84 of the cell receptacle region 58. In other embodiments, the second protruding shelf 86 may extend along only a portion of the second perimeter 84. As shown in the illustrated embodiment of FIG. 9, the second protruding shelf 86 may extend a second distance 92 from the second perimeter 84 of the cell receptacle region 58. In certain embodiments, the second distance 92 may be predetermined based on a size of the gap or void that forms between the housing 50 and the cell receptacle region cover 54 before the laser weld is formed. For example, as a size of the gap or void between the housing 50 and the cell receptacle region cover 54 increases, the second distance 92 may also increase, such that more molten material may be formed to fill in the gap or void. Similarly, as the size of the gap or void between the housing 50 and the cell receptacle region cover 54 decreases, the second distance 92 may also decrease because less molten material may be utilized to fill the gap or void. Additionally, in certain embodiments, the second distance 92 may be substantially constant along the second perimeter 84 of the cell receptacle region 58. In other embodiments, the second distance 92 may vary along the second perimeter 84 in proportion to a size of the gap or void between the housing 50 and the cell receptacle region cover 54. In still further embodiments, the second distance 92 may vary along the second perimeter 84 in proportion to a second groove of the second protruding shelf 86 (see FIG. 10).

As shown in the illustrated embodiment of FIG. 9, the second protruding shelf 86 includes relatively sharp edges and/or corners that correspond to edges and corners around the second perimeter 84 of the cell receptacle region 58. However, it should be noted that the second protruding shelf 86 may include edges and/or corners with any suitable shape (e.g., rounded edges and/or corners).

Figure 10:
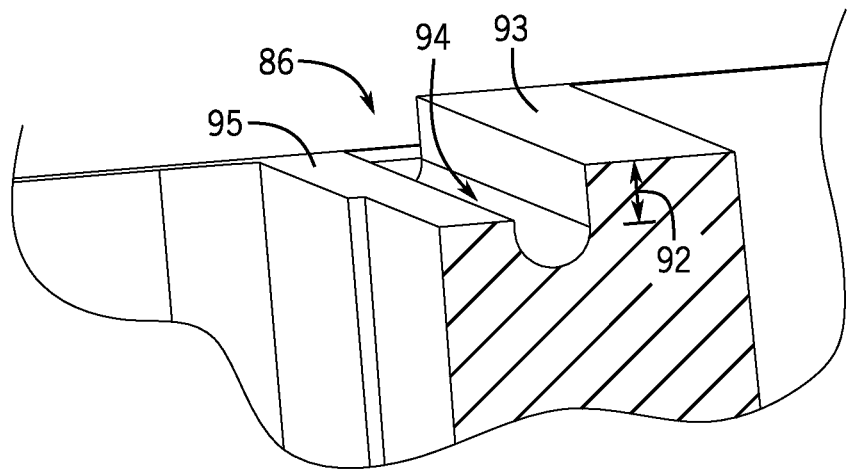
FIG. 10 is a cross-sectional perspective view of the second protruding shelf of FIG. 8, in accordance with an aspect of the present disclosure.

Additionally, the second protruding shelf 86 may include a second protrusion 93, a second groove 94, and a second lip 95, as shown in FIG. 10. For example, the second protruding shelf 86 may include the second protrusion 93 that extends the second distance 92 from the second lip 95. In certain embodiments, the laser may be directed toward the second protrusion 93, thereby causing the second protrusion 93 to melt. As the second protrusion 93 melts, molten material may collect in the second groove 94, which may prevent molten material from spilling over the second lip 95. In certain embodiments, the second groove 94 may include a semi-circular shaped cross-section that enables molten material to collect in the second groove 94 and to contact the cell receptacle region cover 54. In other embodiments, the second groove 94 may include any suitable shape to enable the molten material to collect in the second groove 94 and to contact the cell receptacle region cover 54. When the molten material cools and re-hardens (e.g., re-solidifies), the cell receptacle region cover 54 may adhere to the housing 50. In certain embodiments, the molten material may fill any gaps and/or voids between the cell receptacle region cover 54 and the housing 50, thereby forming a substantially air-tight and/or water-tight seal.

Figure 11:
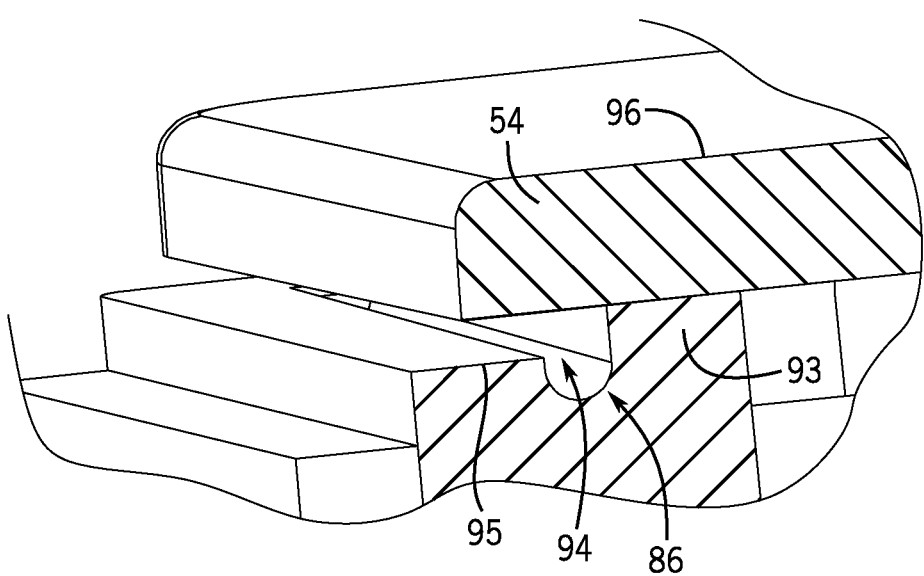
FIG. 11 is a cross-sectional perspective view of the receptacle region cover of FIG. 4 disposed adjacent to the second protruding shelf of FIGS. 9 and 10, in accordance with an aspect of the present disclosure.

In certain embodiments, the second protrusion 93 of the second protruding shelf 86 may be configured to provide a contact surface for the cell receptacle region cover 54 prior to formation of the laser weld. For example, FIG. 11 is a cross-sectional perspective view of the cell receptacle region cover 54 adjacent to the second protrusion 93 of the second protruding shelf 86. As shown in the illustrated embodiment of FIG. 11, the second protrusion 93 of the second protruding shelf 86 is disposed against the cell receptacle region cover 54; however, the cell receptacle region cover 54 does not interlock with the second protruding shelf 86 and/or another feature of the housing 50 (e.g., via an interference fit). A laser weld may be performed to couple the cell receptacle region cover 54 to the housing 50. Accordingly, in certain embodiments, a laser may be directed at a fourth perimeter 96 of the cell receptacle region cover 54, such that a weld spot of the laser is aligned with the second protruding shelf 86. When the cell receptacle region cover 54 includes the second transmissive material, the laser may be directed through the fourth perimeter 96 of the cell receptacle region cover 54 and toward the second protrusion 93 of the second protruding shelf 86. Accordingly, when the material of the second protrusion 93 reaches a melting point, molten material may collect in the second groove 94 and fill a gap between the cell receptacle region cover 54 and the housing 50. The laser may then be removed (or turned off) such that the molten material may cool and re-harden (e.g., re-solidify). Upon re-hardening, the housing 50 may adhere to the cell receptacle region cover 54, thereby eliminating and/or substantially reducing any gaps and/or openings that may form between the housing 50 and the cell receptacle region cover 54.

Figure 12:
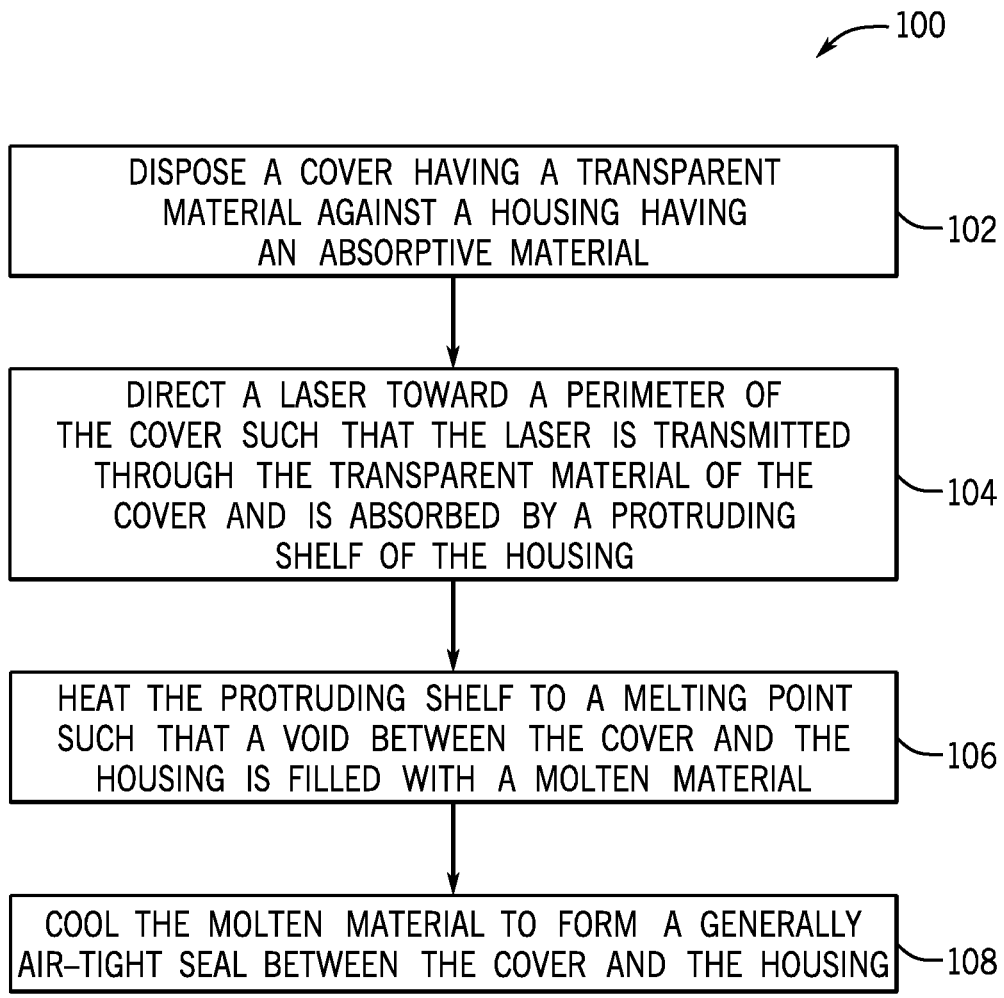
FIG. 12 is a flow chart of a laser welding process that utilizes different transmissivities and that may be utilized when the electronics compartment cover includes a first transmissive material and/or when the cell receptacle region cover includes a second transmissive material, in accordance with an aspect of the present disclosure.

As discussed above, when the electronics compartment cover 52 includes the first transmissive material and/or when the cell receptacle region cover 54 includes the second transmissive material, a laser welding process may be utilized that directly welds the electronics compartment cover 52 and/or the cell receptacle region cover 54 to the housing 50 (e.g., via the first and/or second protruding shelves 82, 86). For example, FIG. 12 is a flow chart 100 for a laser welding process that may be utilized when the electronics compartment cover 52 includes the first transmissive material and/or when the cell receptacle region cover 54 includes the second transmissive material.

At block 102, the electronics compartment cover 52 and/or the cell receptacle region cover 54 may be disposed against the housing 50. In certain embodiments, a clamp may be utilized to press the electronics compartment cover 52 and/or the cell receptacle region cover 54 toward the housing 50, thereby securing the electronics compartment cover 52 and/or the cell receptacle region cover 54 during the welding process. As used herein, the clamp may be a device configured to substantially exert a biasing force on the third perimeter 91 of the electronics compartment cover 52 and/or the fourth perimeter 96 of the cell receptacle region cover 54 toward the housing 50. Such biasing force may ensure that the gap and/or void between the electronics compartment cover 52 and the housing 50 and/or the cell receptacle region cover 54 and the housing 50 remains substantially constant throughout the welding process. Additionally, the clamp may prevent movement of the electronics compartment cover 52 and/or the cell receptacle region cover 54 during the welding process. In some cases, movement of the electronics compartment cover 52 and/or the cell receptacle region cover 54 may be undesirable because it may result in a weaker laser weld.

At block 104, the laser may be directed toward the third perimeter 91 of the electronics compartment cover 52 and/or the fourth perimeter 96 of the cell receptacle region cover 54. In certain embodiments, the laser, the third perimeter 91, and the first protruding shelf 82 (e.g., the protrusion 88) may be in substantial alignment when laser welding the electronics compartment cover 52 to the housing 50. Similarly, the laser, the fourth perimeter 96, and the second protruding shelf 86 (e.g., the second protrusion 93) may be in substantial alignment when laser welding the cell receptacle region cover 54 to the housing 50. Accordingly, when the laser is directed toward the third perimeter 91 and/or the fourth perimeter 96, the laser may be transmitted through the first transmissive material of the electronics compartment cover 52 and/or the second transmissive material of the cell receptacle region cover 54. Therefore, the energy (e.g., light) from the laser may be received and absorbed by the protrusion 88 of the first protruding shelf 82 (e.g., that includes the absorptive material) and/or the second protrusion 93 of the second protruding shelf 86 (e.g., that includes the absorptive material).

In certain embodiments, the laser may be directed toward the third perimeter 91 and/or the fourth perimeter 96 by passing the laser over the third perimeter 91 and/or the fourth perimeter 96 a predetermined number of times. For example, the laser may be directed around the third perimeter 91 and/or the fourth perimeter 96 between 1 and 10 times, between 2 and 8 times, between 5 and 6 times, or any suitable number of times to enable the absorptive material of the first protruding shelf 82 (e.g., the protrusion 88) and/or the second protruding shelf 86 (e.g., the second protrusion 93) to melt.

Additionally, the laser may be angled with respect to a first surface of the electronics compartment cover 52 and/or a second surface of the cell receptacle region cover 54. For example, the laser may not be substantially perpendicular to the first surface of the electronics compartment cover 52 when laser welding the electronics compartment cover 52 to the housing 50. Accordingly, the laser may be positioned such that a maximum amount of energy (e.g., light) from the laser may be received and/or absorbed by the first protruding shelf 82. Additionally, the laser may not be substantially perpendicular to the second surface of the cell receptacle region cover 54 when laser welding the cell receptacle region cover 54 to the housing 50. Rather, the laser may be angled with respect to the second surface of the cell receptacle region cover 54. Accordingly, the laser may be directed to the second protruding shelf 86 at an angle that enables a desired amount of temperature increase of the second protruding shelf 86 (e.g., the second protrusion 93).

At block 106, the laser transmitted toward the first protruding shelf 82 and/or the second protruding shelf 86 may cause the protrusion 88 of the first protruding shelf 82 (e.g., having the absorptive material) and/or the second protrusion 93 of the second protruding shelf 86 (e.g., having the thermally absorptive material) to increase in temperature. As the temperature of the protrusion 88 and/or the second protrusion 93 increases, the absorptive material may begin to melt to form a molten material. Accordingly, the molten material may collect in the groove 89 and/or the second groove 94 and fill a gap between the electronics compartment cover 52 and the housing 50 and/or a gap between the cell receptacle region cover 54 and the housing 50.

At block 108, the molten material may be cooled when the laser is no longer directed toward the third perimeter 91 and/or the fourth perimeter 96 (e.g., when the laser is no longer incident on the third perimeter 91 and/or the fourth perimeter 96 and/or when the laser is turned off). Because the molten material may fill the gap between the electronics compartment cover 52 and the housing 50 and/or the gap between the cell receptacle region cover 54 and the housing 50, the molten material may cause the electronics compartment cover 52 and/or the cell receptacle region cover 54 to adhere to the housing 50 when the molten material re-hardens (e.g., re-solidifies). Accordingly, the electronics compartment cover 52 and/or the cell receptacle region cover 54 may be coupled to the housing 50, and gaps (e.g., substantially all gaps) or openings between the electronics compartment cover 52 and the housing 50 and/or between the cell receptacle region cover 54 and the housing 50 may be eliminated or substantially reduced.

As discussed above, the electronics compartment cover 52 may not include the first transmissive material and/or the cell receptacle region cover 54 may not include the second transmissive material (e.g., when the electronics compartment cover 52 and/or the cell receptacle region cover 54 are purchased from a supplier). In accordance with certain embodiments of the present disclosure, when the electronics compartment cover 52 and/or the cell receptacle region cover 54 include an absorptive material, a collar may be used to couple the electronics compartment cover 52 and/or the cell receptacle region cover 54 to the housing 50. The collar may also substantially eliminate and/or reduce any gaps or openings between the electronics compartment cover 52 and the housing 50 and/or between the cell receptacle region cover 54 and the housing 50 to form a substantially air-tight and/or water-tight seal. Additionally, the collar may be utilized to couple the electronics compartment cover 52 to the housing 50 and/or the cell receptacle region cover 54 to the housing 50 even when the electronics compartment cover 52 includes the first transmissive material and/or the cell receptacle region cover 54 includes the second transmissive material. In certain embodiments, it may be desirable to utilize the collar because the laser weld between a cover of the battery module (e.g., the electronics compartment cover 52 and/or the cell receptacle region cover 54) and the housing 50 may be broken without substantially damaging the cover and/or the housing 50 (e.g., thereby facilitating servicing of the battery module 20).

For example, FIG. 13 is a perspective view of an embodiment of the battery module 20 sealed using a collar 120. For simplicity, the following discussion focuses on coupling the cell receptacle region cover 54 to the housing 50 utilizing the collar 120. However, it should be noted that the electronics compartment cover 52 discussed above with respect to FIGS. 3-11 may also be coupled to the housing 50 using the collar 120. As shown in the illustrated embodiment of FIG. 13, the collar 120 is disposed around an entire first perimeter 122 of the housing 50, which also corresponds to a second perimeter 124 of the cell receptacle region cover 54. Accordingly, the collar 120 may seal the cell receptacle region cover 54 to the housing 50 without leaving any gaps and/or openings, such that the seal is substantially air-tight and/or water-tight.

In certain embodiments, the collar 120 may include a transmissive material (e.g., a transparent material that is more transmissive than the housing 50 and/or the cell receptacle region cover 54). For example, the collar 120 may include a clear polymeric material that may allow transmission of laser energy (e.g., light) to pass through the collar 120 without absorbing a substantial amount of the laser energy. In other words, the transmissive material (e.g., the transparent material) may enable a laser emission to pass from a first surface (e.g., an outer surface) of the collar 120 to a second surface (e.g., a surface positioned against the housing 50 and the cell receptacle region cover 54) of the collar 120 without increasing a temperature of the collar 120. In certain embodiments, the transmissive material may include clear polypropylene. In other embodiments, the transmissive material may be transmissive black polypropylene.

Further, the transmissive material of the collar 120 may include one or more fillers. For example, the collar 120 may include polypropylene (e.g., black transmissive polypropylene) that has a glass filler. The glass filler may add structural reinforcement to the base material (e.g., black transmissive polypropylene), thereby enhancing a strength of the base material. In certain embodiments, the glass filler may also reduce a transmissivity of the collar 120, thereby increasing an amount of thermal energy that the collar 120 may absorb. The amount of filler included in the transmissive material of the collar 120 may depend on a desired transmissivity of the collar 120 and/or a wavelength of a laser that may be used for the laser welding process. For example, a percent weight of glass filler included in the collar 120 may be between 0% and 50%, between 10% and 40%, between 25% and 35%, or any combination thereof.

In certain embodiments, the weight percent of the glass filler may be inversely proportional to the wavelength and/or proportional to the power of the laser. For example, as the wavelength of the laser increases, the power of the laser (e.g., energy output) decreases, and thus, it may be desirable to include a lower percent weight of filler to increase transmissivity and enable more energy to pass through the collar 120. Conversely, as the wavelength of the laser decreases, the power of the laser (e.g., the energy output) may increase. Therefore, it may be desirable to increase the percent weight of filler in the collar 120 such that a portion of the energy is absorbed by the transmissive material of the collar 120 and an amount of energy passing through the collar 120 may be substantially constant.

In other embodiments, the transmissive material of the collar 120 may include polyphenylene sulfide (PPS), nylon, or any combination thereof. Additionally, the PPS and/or the nylon may or may not include fillers.

Additionally, the cell receptacle region cover 54 and/or the housing 50 may include an absorptive material (e.g., a material more absorptive than the collar 120). For example, the cell receptacle region cover 54 and/or the housing 50 may include the absorptive material having the same material properties as described above. Accordingly, when the laser is directed toward the housing 50 and/or the cell receptacle region cover 54, the housing 50 and/or the cell receptacle region cover 54 may be configured to absorb the energy emitted from the laser. Additionally, the cell receptacle region cover 54 and/or the housing may include a metallic material that may also be configured to absorb energy (e.g., light) emitted from the laser. In certain embodiments, the absorption of energy may cause a temperature of the housing 50 and/or the cell receptacle region cover 54 to increase. In certain embodiments, the increase in temperature of the housing 50 and the cell receptacle region cover 54 may cause a portion of the collar 120 to melt, thereby causing the housing 50 to adhere to the collar 120 (e.g., when the molten portion of the collar 120 re-hardens) and the cell receptacle region cover 54 to adhere to the collar (e.g., when the molten portion of the collar 120 re-hardens). In other embodiments, the increase in temperature of the housing 50 and/or the cell receptacle region cover 54 may cause a first portion of the housing 50 and/or a second portion of the cell receptacle region cover 54 to melt. Accordingly, the first portion and/or the second portion may cause the housing 50 and/or the cell receptacle region cover 54 to adhere to the collar 120 (e.g., when the first portion and/or the second portion re-harden).

Additionally, the collar 120 may include physical features that may facilitate coupling the cell receptacle region cover 54 to the housing 50. For example, FIG. 14 is a cross-sectional perspective view of a laser weld between the collar 120, the housing 50, and the cell receptacle region cover 54. As shown in the illustrated embodiment of FIG. 14, the collar 120 includes a staircase configuration (e.g., a stepped geometry) such that the collar 120 directly contacts the cell receptacle region cover 54 and the housing 50. For example, a first step 126 of the collar 120 may be configured to contact the housing 50 and a second step 128 of the collar 120 may be configured to contact the cell receptacle region cover 54. Accordingly, when laser welding the cell receptacle region cover 54 to the housing 50, the laser may pass through the first step 126 toward the housing 50, thereby increasing the temperature of the housing 50. As discussed above, in certain embodiments, increasing the temperature of the housing 50 may cause the first step 126 of the collar 120 to melt and form a molten material. In other embodiments, increasing the temperature of the housing may cause the first portion of the housing 50 to melt to form a molten material. Similarly, the laser may pass through the second step 128 toward the cell receptacle region cover 54, thereby increasing the temperature of the cell receptacle region cover 54. In certain embodiments, increasing the temperature of the cell receptacle region cover 54 may cause the second step 128 to melt and form a molten material. In other embodiments, increasing the temperature of the cell receptacle region cover 54 may cause the second portion of the cell receptacle region cover 54 to melt and form the molten material. In any case, the molten material may cause both the housing 50 and the cell receptacle region cover 54 to adhere to the collar 120. Accordingly, the housing 50 and the cell receptacle region cover 54 may be coupled to one another via the collar 120.

The seal between the housing 50, the cell receptacle region cover 54, and the collar 120 may be substantially air-tight and/or water-tight because the molten material may fill any gaps and/or voids between the housing 50 and the collar 120 and/or between the cell receptacle region cover 54 and the collar 120. Since the collar 120 extends along the entire first perimeter 122 and the entire second perimeter 124, gaps and/or voids between the cell receptacle region cover 54 and the housing 50 may be substantially eliminated or reduced. Laser welding the cell receptacle region cover 54 to the housing 50 when the cell receptacle region cover 54 includes an absorptive material may thus produce an enhanced seal between the cell receptacle region cover 54 and the housing 50 when the collar 120 is utilized.

For example, FIG. 15 is a flow chart 140 of a process for sealing the cell receptacle region cover 54 to the housing 50 using the collar 120. At block 142, the collar 120 is disposed around the first perimeter 122 of the housing 50 and the second perimeter 124 of the cell receptacle region cover 54. Accordingly, the first step 126 of the collar 120 may directly contact the housing 50 and the second step 128 of the collar 120 may directly contact the cell receptacle region cover 54.

At block 144, a laser may be directed toward a third perimeter of the collar 120. In certain embodiments, the laser, the third perimeter of the collar 120, the first perimeter 122 of the housing 50, and the second perimeter 124 of the cell receptacle region cover 54 may be in substantial alignment. Accordingly, when the laser is directed toward the third perimeter, the laser may be transmitted through the transparent material of the collar 120 toward the housing 50 and the cell receptacle region cover 54. Therefore, energy from the laser may be absorbed by a first absorptive material of the housing 50 and/or a second absorptive material of the cell receptacle region cover 54. In other embodiments, the laser may be rotated and/or moved in a sinusoidal motion such that the laser contacts both the housing 50 and the cell receptacle region cover 54.

In certain embodiments, the laser may be directed toward the third perimeter by passing the laser over the third perimeter a predetermined number of times. For example, the laser may be directed around the third perimeter between 1 and 10 times, between 2 and 8 times, between 5 and 6 times, or any suitable number of times that may enable the first absorptive material of the housing 50 and the second absorptive material of the cell receptacle region cover 54 to melt. Alternatively or additionally, the increase in temperature of the housing 50 and the cell receptacle region cover 54 may cause the collar 120 to melt over the perimeters 122, 124.

Additionally, the laser may be angled with respect to a surface 145 (see FIG. 14) of the collar 120. For example, the laser may not be substantially perpendicular to the surface 145 of the collar 120. Accordingly, the laser may be positioned such that a maximum amount of energy (e.g., light) from the laser may be received and/or absorbed by the housing 50 and the cell receptacle region cover 54.

At block 146, absorption of the laser by the housing 50 and the cell receptacle region cover 54 may cause a first portion of the housing 50 (e.g., the housing 50 includes the first absorptive material) and a second portion of the cell receptacle region cover 54 (e.g., the cell receptacle region cover 54 includes the second absorptive material) to increase in temperature. As the temperature of the first portion of the housing 50 increases, the first portion of the housing 50 and/or a first portion of the collar 120 (e.g., the first step 126) may melt to form a first molten material. Similarly, as the temperature of the second portion of the cell receptacle region cover 54 increases, the second portion of the cell receptacle region cover 54 and/or a second portion of the collar 120 (e.g., the second step 128) may melt to form a second molten material. Accordingly, the first molten material may fill a first gap between the collar 120 and the housing 50. Similarly, the second molten material may fill a second gap between the collar 120 and the cell receptacle region cover 54. In other embodiments, the first molten material may fill the first gap and/or the second gap, and the second molten material may also fill the first gap and/or the second gap.

At block 148, the first molten material may be cooled when the laser is no longer directed toward the third perimeter (e.g., when the laser has finished passing over the third perimeter and/or when the laser has been turned off). Because the first molten material may fill the gap between the collar 120 and the housing 50, the first molten material may cause the housing 50 to adhere to the collar 120 as the first molten material re-hardens (e.g., re-solidifies). Similarly, the second molten material may also be cooled when the laser is no longer directed toward the third perimeter. Because the second molten material may fill the gap between the collar 120 and the cell receptacle region cover 54, the second molten material may cause the cell receptacle region cover 54 to adhere to the collar 120 as the second molten material re-hardens (e.g., re-solidifies). Accordingly, both the housing 50 and the cell receptacle region cover 54 may be coupled to the collar 120. Moreover, any gaps or openings between the housing 50, the cell receptacle region cover 54, and/or the collar 120 may be eliminated or substantially reduced.

One or more of the disclosed embodiments, alone or in combination, may provide one or more technical effects useful in the manufacture of battery modules, and portions of battery modules. In general, embodiments of the present disclosure include an improved laser welding technique for creating a robust, substantially air-tight and/or water-tight seal between a battery module housing and one or more covers. In some cases, a collar may be utilized to couple the housing to the one or more covers when a laser may not be transmitted through the housing and/or the one or more covers. Forming a substantially air-tight and/or water-tight seal between the housing and the one or more covers may enable the battery module to be protected from contaminants such as water and dirt. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
a housing comprising a main body, a first protruding shelf disposed along a first perimeter of the housing, and a second protruding shelf disposed along a second perimeter of the housing, wherein the first protruding shelf and the second protruding shelf each comprise an absorptive material configured to absorb a first laser emission, the first protruding shelf comprises a first protrusion, a first lip on an external surface of the housing, and a first groove between the first protrusion and the first lip, the second protruding shelf comprises a second protrusion, a second lip, and a second groove between the second protrusion and the second lip, the first protrusion is configured to form a first molten material that collects in the first groove when exposed to the first laser emission to form a first laser weld, and the second protrusion is configured to form a second molten material that collects in the second groove when exposed to the first laser emission or a second laser emission to form a second laser weld;
an electronics compartment cover configured to be coupled to the housing via the first laser weld, wherein the electronics compartment cover comprises a first transparent material configured to transmit the first laser emission through the electronics compartment cover and toward the first protrusion, the first lip extends from the main body of the housing in a first direction, the electronics compartment cover is configured to overlap with the first lip in a second direction, and the second direction is crosswise to the first direction; and
a cell receptacle region cover configured to be coupled to the housing via the second laser weld, wherein the cell receptacle region cover comprises a second transparent material configured to transmit the first laser emission or the second laser emission through the cell receptacle region cover and toward the second protrusion.

2. The battery module of claim 1, wherein the first protrusion extends a first distance from the first lip, and the second protrusion extends a second distance from the second lip.

3. The battery module of claim 1, wherein the first protrusion comprises a predetermined volume configured to produce an amount of the first molten material to fill a first void between the electronics compartment cover and the housing.

4. The battery module of claim 1, wherein the second protrusion comprises a predetermined volume configured to produce an amount of the second molten material to fill a second void between the cell receptacle region cover and the housing.

5. The battery module of claim 1, wherein the first molten material is configured to cause the electronics compartment cover to adhere to the housing via the first protruding shelf, and wherein the second molten material is configured to cause the cell receptacle region cover to adhere to the housing via the second protruding shelf.

6. The battery module of claim 1, wherein the housing comprises an electronics compartment and a cell receptacle region, wherein the electronics compartment is transverse to the cell receptacle region, wherein the electronics compartment cover is configured to cover the electronics compartment, and wherein the cell receptacle region cover is configured to cover the cell receptacle region.

7. The battery module of claim 1, wherein the absorptive material comprises a polymeric material.

8. The battery module of claim 1, wherein one or both of the first transparent material and the second transparent material comprises a polymeric material.

9. The battery module of claim 8, wherein the polymeric material comprises a colorant additive, a glass filler, or a combination thereof.

10. The battery module of claim 1, comprising one or more electrochemical battery cells that are each individually sealed by a respective casing and disposed in the housing.

11. The battery module of claim 10, wherein the absorptive material is configured to block the laser emission from contacting the one or more electrochemical battery cells.

12. The battery module of claim 1, wherein the first laser weld is a generally air-tight and water-tight seal between the electronics compartment cover and the housing and the second laser weld is a generally air-tight and water-tight seal between the cell receptacle region cover and the housing.

13. The battery module of claim 1, wherein the electronics compartment cover is configured to transmit substantially all of the laser emission toward the first protruding shelf and the cell receptacle region cover is configured to transmit substantially all of the laser emission toward the second protruding shelf.

14. A battery module housing assembly, comprising:
a housing comprising an absorptive material, an electronics compartment, and a cell receptacle region, wherein the electronics compartment comprises a first perimeter having a first protruding shelf that extends from a first inner surface of the electronics compartment, wherein the cell receptacle region comprises a second perimeter having a second protruding shelf that extends from a second inner surface of the cell receptacle region, and wherein the electronics compartment is configured to receive a plurality of electronics components and the cell receptacle region is configured to receive a plurality of electrochemical battery cells;
an electronics compartment cover comprising a first transparent material, wherein the electronics compartment cover is configured to cover the electronics compartment and is capable of forming a first seal with the housing via a first laser weld; and
a cell receptacle region cover comprising a second transparent material, wherein the cell receptacle region cover is configured to cover the cell receptacle region and is capable of forming a second seal with the housing via a second laser weld, and wherein one or both of the first laser weld and the second laser weld are formed according to a process, comprising:
disposing the cell receptacle region cover or the electronics compartment cover against the housing;
directing a laser toward a third perimeter of the electronics compartment cover or a fourth perimeter of the cell receptacle region cover such that the laser is transmitted through the first transparent material or the second transparent material and is absorbed by the first protruding shelf or the second protruding shelf, respectively;
heating the first protruding shelf or the second protruding shelf to a melting point such that a void between the electronics compartment cover or the cell receptacle region cover and the housing is filled with a molten material; and
cooling the molten material to form a generally air-tight and water-tight seal between the electronics compartment cover and the housing or the cell receptacle region cover and the housing.

15. The battery module housing assembly of claim 14, wherein the process comprises passing the laser over the third perimeter of the electronics compartment cover or the fourth perimeter of the cell receptacle region cover between five and six times.

16. The battery module housing assembly of claim 14, wherein the process comprises angling the laser such that the laser is not substantially perpendicular to a weld surface of the housing.

17. The battery module housing assembly of claim 14, wherein the first protruding shelf or the second protruding shelf comprises a thickness configured to produce an amount of the molten material to fill the void.

18. The battery module of claim 1, wherein the second lip extends from the main body of the housing in a third direction, the cell receptacle region cover is configured to overlap with the second lip in a fourth direction, and the third direction is crosswise to the fourth direction.

19. The battery module of claim 1, wherein the first lip comprises an outermost portion of the main body of the housing relative to the second direction.

20. The battery module housing assembly of claim 14, wherein the first protruding shelf comprises a first protrusion, a first lip, and a first groove between the first protrusion and the first lip, wherein the first lip and the first groove at least partially define the void between the electronics compartment cover and the housing.

* * * * *